Patented Mar. 28, 1939

2,152,185

UNITED STATES PATENT OFFICE 2,152,185

PROCESS FOR SULPHURIZING ORGANIC COMPOUNDS HAVING UNSATURATED LINKAGES OF AN ALIPHATIC CHARACTER

Edward Gottesmann, Berlin-Charlottenburg, Germany, assignor, by mesne assignments, to Karl Werner Posnansky, Berlin-Charlottenburg, Germany No Drawing. Application March 22, 1935, Serial No. 12,518. In Germany March 26, 1934

12 Claims. (Cl. 106—23)

The object of the invention is a process for the accumulating of sulphur in compounds having double of multibonds of an aliphatic character, and for facilitating the polymerization of such substances in the presence of sulphur. The new process has many advantages as compared with the methods hitherto usual, and will first be explained in connection with the manufacture of sulphurized oils (rubber substitute).

Hitherto, rubber substitute (Faktis) has generally been made by treating plant or animal fatty oils with sulphur by a hot method. The products obtained have the drawback of being rather strongly colored (brown substitute), which is unsatisfactory when employing them as an addition to light-colored rubber goods.

Another process consists in treating the starting materials with sulphur chloride by a cold method. Pale colored products (white substitute) are thereby produced. These products, however, contain chlorine, which is often undesirable in the subsequent treatment.

The drawbacks of both processes are avoided according to the invention, by sulphur and hydrogen sulphide being simultaneously caused to react, instead of sulphur or chloride of sulphur. In this way pale rubber substitute, free from chlorine can be obtained. It is preferable to work at temperatures above 100°, and to promote the reaction by catalysts. As catalysts, basic or other substances which are somewhat soluble in oil, and act as sulphur-carriers, can be employed. The bases should preferably not act on the oil with a saponifying action, or only to a slight degree in the reaction conditions under which the process is conducted. For example, ammonia, hydrazine, aliphatic amines, aromatic amines, heterocyclic amines, piperidine, acid amide and so on, may be employed, and further, the substances known as vulcanization accelerators, such as di- or tri- substituted guanidine, thiuramsulphide, cyclohexylethylamine and the like. The catalysts may be employed separately or in admixture with each other, and if desired in the presence of solid or liquid loading materials or mineral oils.

The hydrogen sulphide required for the reaction may be supplied as such in any state of aggregation, or substances may be employed from which hydrogen sulphide is released during the reaction, for example ammonium hydrosulphide.

The process is not limited to the manufacture of rubber substitute, but is quite generally applicable in cases where it is a question of the accumulating of sulphur in double or multibonds of an aliphatic character, or the polymerization of such compounds in the presence of sulphur, for example, in the accumulating of sulphur in animal, vegetable or mineral oils for the manufacture of soaps or impregnating media, or products suitable for paints; furthermore, in unsaturated alcohols and esters of the terpene series, etheric oils, vinylacetate and the like. The process is particularly suitable also for the manufacture of rubber goods from caoutchouc and of vulcanized products from balata or gutta percha.

The sulphurization of rubber may, for example, be carried out by layers of rubber, obtained from solutions by evaporation of the solvent or from latex, and containing the necessary additions (for example, sulphur, rubber substitute and so forth) being exposed to a moderate heat in an atmosphere of hydrogen sulphide.

According to the prevailing view, in the vulcanization with sulphur, or sulphur monochloride an accumulation of these substances in double bonds occurs. In the new process, the vulcanization seems to be due to a reaction of addition taking place between the double bonds and intermediately (catalytically) formed sulphur hydrides.

The process forming the object of the invention for the accumulating of sulphur in multiple bonds of an aliphatic character by treatment with a mixture of sulphur and hydrogen sulphide may also be employed for obtaining partially sulphurated oils, which may either be employed as such, or further treated by one of the known processes (sulphur monochloride) or by the process forming the object of the invention. If, for example, a quantity of the mixture of sulphur and hydrogen sulphide which is not sufficient for the production of a solid product is added to the oils, or the sulphurization reaction is interrupted prematurely, a thick, almost colorless oil is obtained, from which any excess of sulphur present may be filtered off. This oil may be employed as liquid rubber substitute, for example, in the manufacture of paints or impregnating media.

In general, the process has the advantage that the take-up of sulphur is possible at lower temperatures than by the usual methods of working by heating with sulphur, so that in cases where the starting materials do not permit much heating sulphurization is first made possible by the new process. The degree of temperature and the duration of the reaction are, of course, different for the separate starting materials and can be easily determined in each case.

In the manufacture of rubber substitute the new process has the advantage that pale-colored products are obtained which contain no chlorine, and is excellently adapted for the manufacture both of cold-and also hot-vulcanized pale-colored rubber goods.

It has been further found that the substances suitable as catalysts partly act very strongly and even at ordinary temperature as polymerization accelerators, and both with brown substitute made in the usual way and also with the new pale-colored substitute.

Examples

*Example 1.*—A mixture of 20 kg. very light rape seed oil which for example has been refined by an alkaline, and of 3.7 kg. of sulphur is heated in a closed vessel at about 120° C., while at the same time a strong current of hydrogen sulphide is passed through the oil. By taking up sulphur and hydrogen sulphide the mass gradually becomes thicker and finally solidifies completely. The solidified product represents a light transparent factis, from which any small amount of hydrogen sulphide which possibly had been retained in the mass can be removed by blowing air through the mass and (or) by evacuation.

*Example 2.*—100 kg. of castor oil are caused to react at 150° with 21 kg. of sulphur and 1 kg. of a catalyst, for example tetra-methyl-thiuram-disulphide, while a strong current of hydrogen sulphide is passed through. After the mass solidifies it is allowed to stand at about 130° until the desired degree of polymerization is reached. The further treatment takes place as with ordinary brown rubber substitute. The product obtained is reddish by transmitted light in a thick layer and yellow-orange when in powder form.

*Example 3.*—To 1 kg. of cinnamic acid ethyl ester are added 100 g. of sulphur and 5 g. of piperidine as a catalyst. On introducing hydrogen sulphide the reaction begins at 60°, whilst in the known sulphurization with sulphur the reaction only takes place at above 220°.

Styrol also, for example, reacts under the same conditions and in the same manner.

I claim:—

1. A process for sulphurizing an organic unsaturated fatty oil which comprises adding hydrogen sulphide and sulphur to said fatty oil and causing them to react simultaneously with said fatty oil at an elevated temperature.

2. A process for sulphurizing an organic unsaturated fatty oil which comprises adding hydrogen sulphide, sulphur and a sulphur carrier to said fatty oil, and causing said hydrogen sulphide and sulphur to react simultaneously with said fatty oil in the presence of said sulphur carrier at an elevated temperature.

3. A process for sulphurizing an organic unsaturated fatty oil which comprises adding hydrogen sulphide, sulphur and a basic catalyst to said fatty oil, and causing said hydrogen sulphide and said sulphur to react simultaneously with said fatty oil in the presence of said catalyst at an elevated temperature.

4. A process for sulphurizing an organic unsaturated fatty oil which comprises adding hydrogen sulphide, sulphur and a substance known as a vulcanization accelerator to said fatty oil, and causing said hydrogen sulphide and sulphur to react simultaneously with said fatty oil in the presence of said accelerator at an elevated temperature.

5. A process for sulphurizing an organic unsaturated fatty oil which comprises adding hydrogen sulphide and sulphur to said fatty oil, and causing them to react simultaneously with said fatty oil at a temperature above 100 degrees Celsius.

6. A process as claimed in claim 1 in which said fatty oil is a castor oil.

7. A process as claimed in claim 1 in which said fatty oil is rape seed oil.

8. A process of producing a pale rubber substitute (factice) free of chlorine which comprises adding to an organic unsaturated fatty oil sulphur, hydrogen sulphide and a substance selected from the group consisting of ammonia, hydrazine, aliphatic amines, aromatic amines, heterocyclic amines, piperidine, acid amine, di- and trisubstituted guanidine, thiuram sulphide and cyclohexylethylamine, causing said sulphur and said hydrogen sulphide to react simultaneously with said fatty oil at an elevated temperature in the presence of said substance, and continuing to cause said reaction until the product is solidified.

9. A process of producing a pale rubber substitute (factice) free of chlorine which comprises adding hydrogen sulphide, sulphur, a catalyst and a loading material to an organic unsaturated fatty oil, causing said hydrogen sulphide and sulphur to react simultaneously with said fatty oil at an elevated temperature in the presence of said catalyst and said loading material, and continuing to cause said reaction until the resulting product is solidified.

10. A process as claimed in claim 9 in which the loading material is a mineral oil.

11. A process of producing a pale rubber substitute (factice) free of chlorine which comprises adding to an organic unsaturated fatty oil, sulphur and a substance such as ammonium hydrosulphide which releases hydrogen sulphide when reacting with said fatty oil causing said sulphur and said substance to react simultaneously with said fatty oil at an elevated temperature, and continuing to cause said reaction until the resulting product is solidified.

12. A pale rubber substitute (factice) free of chlorine and being obtained by the simultaneous reaction at an elevated temperature of sulphur and hydrogen sulphide with an unsaturated fatty oil.

EDWARD GOTTESMANN.